United States Patent Office 3,216,182
Patented Nov. 9, 1965

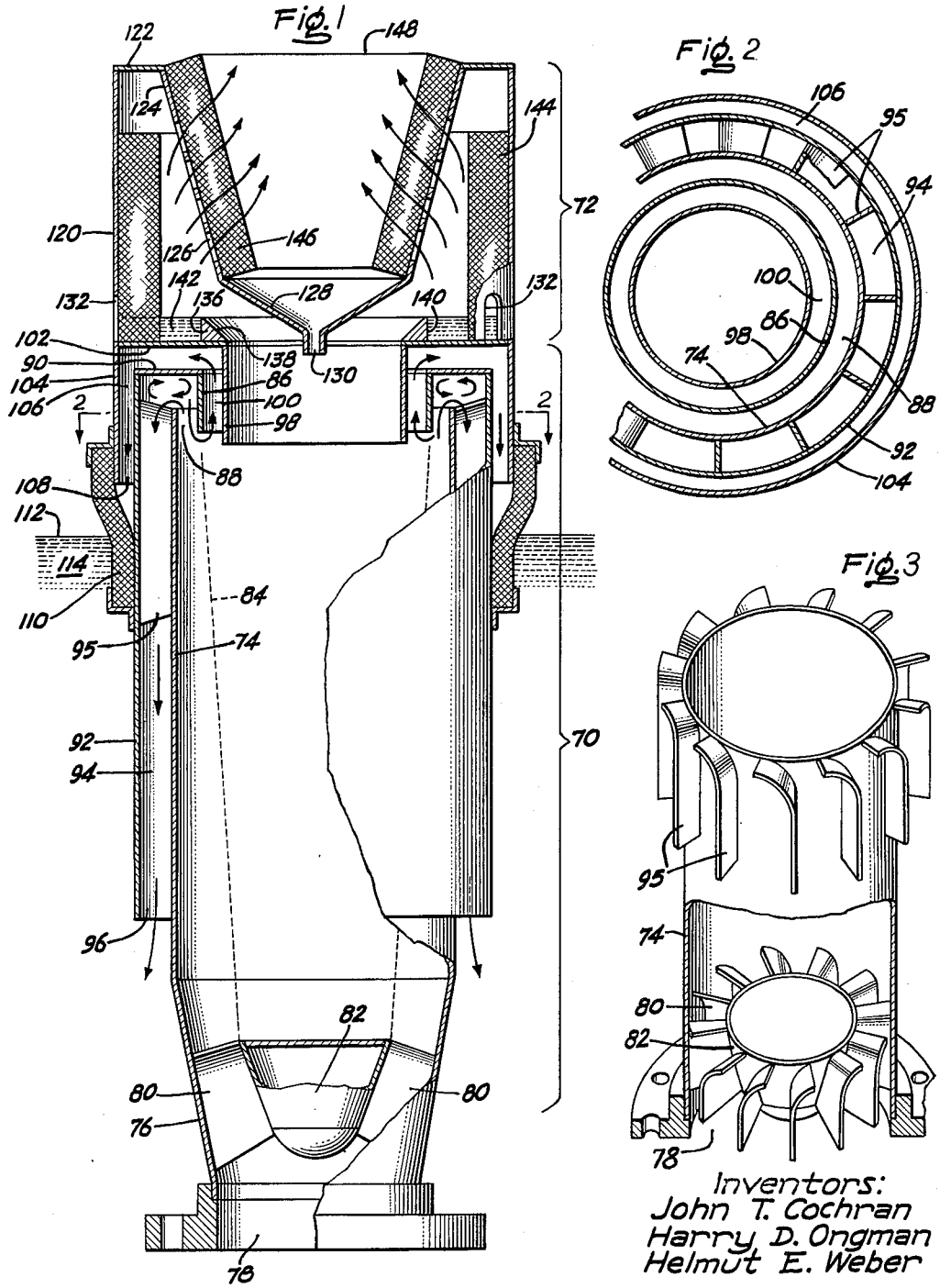

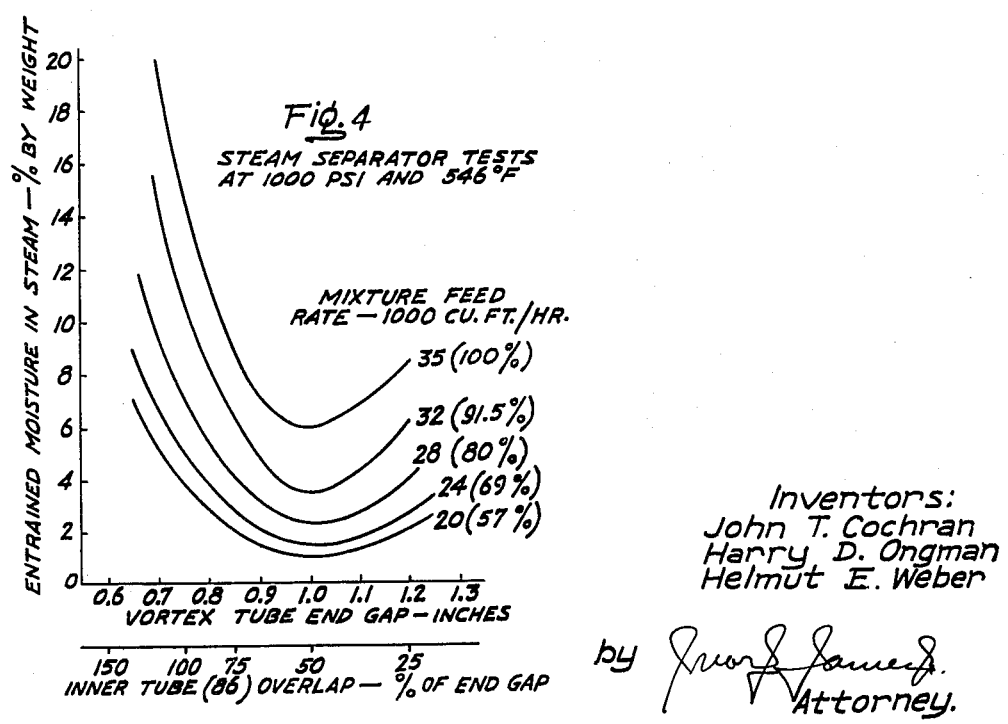

3,216,182
AXIAL FLOW VAPOR-LIQUID SEPARATOR
John T. Cochran, San Jose, and Harry D. Ongman, Santa Clara, Calif., and Helmut E. Weber, Valley Forge, Pa., assignors to General Electric Company, a corporation of New York
Continuation of application Ser. No. 138,765, Sept. 18, 1961. This application Oct. 6, 1964, Ser. No. 405,006
17 Claims. (Cl. 55—336)

This application is a continuation of our co-pending application Serial No. 138,765 filed September 18, 1961, now abandoned.

This invention relates to the separation of vapor from liquid, and particularly relates to a high performance axial flow, vapor-liquid separator, which is effectively applied in the separation of steam from boiling water. In this service, the separators are customarily referred to as steam separators.

Steam is widely used in industrial practice as a fluid for heating and for the driving of prime movers such as steam engines, steam turbines and the like. In virtually all cases it is necessary that the steam be "dry" that is, free from entrained water in the liquid phase. This is particularly true when the steam drives a prime mover of the types mentioned since water accumulations of sufficient volume in a steam engine cylinder can destroy the cylinder, and the presence of excessive entrained water in the steam turbine erodes the turbine buckets and nozzles leading to ultimate failure.

In conventional steam practice where a steam generator is fired by fossil fuels such as coal, oil, or gas, there is ordinarily no great need for steam separators of unusually small physical size which are capable of handling unusually high quantities of mixed steam and water. One example of this is the case of high performance boiler designs where a steam drum is connected to receive a mixture of boiling water and steam from heated tubes. The capacity of the steam drum to effect separation of the steam can be considerably increased by the incorporation in the drum of individual separators of the centrifugal type. These separators receive the steam-water mixture through the steam drum wall, deliver steam into the upper portion of the drum for removal to a load, and discharge the separated water to the lower portion of the drum for removal and revaporization. Even in high performance boiler designs of this type, there has been no great incentive to develop a high performance steam separator since the capacity of the steam drum having such internal separators is most readily and economically increased by increasing the length of the steam drum and the number of separators that it contains. Such a steam drum is shown in U.S. Patent No. 2,648,397.

Recent steam plant development has included the utilization of nuclear fission reactors as steam generators in which a self-sustaining chain nuclear fission reaction is maintained in the reactor core to liberate heat, the heat being transferred to a body of boiling water to effect steam generation. The design and operating principles of boiling water reactors are well known in the art, for example, they are described in "Boiling Water Reactors" by Andrew W. Kramer, Addison-Wesley Publishing Company, 1958, and elsewhere. The boiling water reactor functions primarily as a heat source and delivers a mixture of boiling water and steam which must be separated. In conventional low power density reactors, the steam has been separated by maintaining a free liquid surface somewhere in the reactor vessel above the core as described in the Proceedings of the International Conference on the Peaceful Uses of Atomic Energy, 1955, volume 3, page 56 et seq. and page 250 et seq. However, the volumetric rate at which steam can be separated in such a system is limited to a value equal to the cross sectional area of the free liquid surface multiplied by the maximum superficial velocity at which steam can be removed from such a surface without excessive entrainment of unvaporized water. This maximum velocity varies with pressure and temperature of the system, and at 1000 p.s.i.a. and 546° F. for example, it is about 1 foot per second. Even so, steam separated in this manner contains about 6 percent by weight of entrained liquid water as "carryover," and it must be dried in a steam dryer to reduce the moisture contents to less than about 0.1 weight percent for safe admission to a steam turbine. This 0.1 percent limit is lower than conventional practice because of the necessity for limiting radioactive buildup in the turbine.

Higher power density boiling water reactors require special steam separating equipment. For example, the 192 mwe. (megawatt electrical) boiling water nuclear reactor at Dresden Station near Chicago is provided with a steam drum located approximately 85 feet above the top of the reactor pressure vessel. The drum is about 8 feet in diameter, 66 feet long, and contains about 290 individual steam separators. The steam-water mixture from the reactor is introduced at a rate of about 26.5 million pounds per hour into the separators through a plurality of risers and a manifold. Separated water is returned from the drum to the reactor by means of downcomers at a rate of about 25 million pounds per hour. This elevated steam drum and the elongated risers and downcomers require large amounts of piping, shielding, containment, insulation, supporting structure, and other materials which in this case is justified by the substantial increase in power output of the system relative to that of a conventional boiling water reactor system.

A substantial reduction in the materials required for such a boiling water reactor steam source could be achieved if steam separators of the same capacity could be removed from this elevated position and located within the reactor pressure vessel. However, if a boiling water reactor in a 160 inch inside diameter pressure vessel is provided with the best commercially available prior art steam separators, i.e., those with the highest steam separating capacity per unit volume and which are of the axial flow centrifugal type with mesh type preliminary dryers, the electrical power output is limited by the separator performance at a value of about 200 mwe. This is not substantially greater than the power output of the Dresden Station which has a somewhat smaller pressure vessel.

The present invention is directed to a vapor-liquid separator, particularly a steam separator, which, when substituted for these conventional steam separators in the boiling water reactor referred to immediately above, permit the electric power output of the plant to be increased to a value of at least 300 mwe.

It is an object of this invention therefore to provide an improved high performance vapor-liquid separator for use, for example, in high performance boilers of any kind, including high power density boiling water reactors.

It is an additional object of this invention to provide an improved axial flow centrifugal steam separator and preliminary dryer combination which is capable of receiving steam-water mixtures of from 5 to about 25% quality, that is, mixtures containing 5% to 25% weight of steam, and which is capable of separating such mixtures efficiently at substantially increased rates and delivering separated steam and water at low values of water carry over and steam carry under.

It is the additional object of this invention to provide an improved high performance steam separator which achieves the substantially increased capacity while operating at substantially reduced head losses.

Other objectives and advantages of this invention will become apparent to those skilled in this particular art as the description and illustration proceed.

Briefly, one aspect of this invention is a vapor-liquid separator which comprises an elongated vortex tube having a vapor-liquid mixture inlet opening axially at one end and an outlet opening axially at the other end, means adjacent said inlet opening for imparting to a vapor-liquid mixture a rotary motion sufficient to establish within the vortex tube a vapor vortex surrounded by a coaxial liquid vortex, a first annular liquid removal means surrounding and spaced apart from the outlet edge of the vortex tube and forming therebetween a first annular liquid flow reversing outlet passage adapted to receive the liquid vortex at said outlet end and conduct it 180° around the end of said vortex tube, a second annular liquid removal means surrounding and spaced apart from the first annular means and forming therebetween a second annular liquid flow reversing outlet passage to receive boundary layer liquid spillage from the entrance to said first annular means and further adapted to conduct said spillage through 180° around the first annular means, the second annular means having a central opening through which the vapor vortex discharges from said vortex tube.

An aditional aspect of this invention comprises a preliminary dryer adapted to be connected in vapor-receiving relation to the device defined in the paragraph above or with other separators, which dryer comprises a dryer housing having an inlet opening centrally located at one end and a dried vapor outlet opening centrally located at the other end, a cylindrical layer of fluid permeable contact material disposed on the inner wall of the housing, a conical layer of fluid permeable contact material disposed apex downward within and spaced apart from the cylindrical layer and secured at its upper edge to the upper edge of said outer housing, and means for removing from each of said fluid permeable layers liquid accumulated therein from said vapor.

The present invention will be more readily understood by reference to the accompanying drawings, all of which are described as applied to the separation of steam and water, in which:

FIGURE 1 is a longitudinal view in partial cross section of the improved axial flow centrifugal steam separator and preliminary dryer of this invention;

FIGURE 2 is a transverse cross section view of the separator of FIGURE 1 taken at the elevation shown;

FIGURE 3 is an oblique view in partial cross section showing the liquid discharge straightening vanes in the first liquid flow outlet passage and the vortex forming nozzles at the inlet end of the vortex tube in the device of FIGURES 1 and 2; and FIGURE 4 is a graphic illustration of the improved performance of the vapor liquid separator of this invention in steam service.

In FIGURE 1 is shown a longitudinal view in partial cross section of the improved vapor-liquid separator and preliminary dryer combination according to this invention. This apparatus consists of a separator portion 70 and a preliminary dryer portion 72. The separator portion includes a vortex tube 74 having an entrance tube 76 communicating the vortex tube with inlet opening 78. Adjacent the entrance to vortex tube 74 is disposed a plurality of vanes 80 supported between a central hub 82 and the adjacent inner wall of the surrounding structure. The nozzles or passages formed between the vanes impart to the entering steam-water mixture a rotary motion forming an inner steam vortex surrounded by an outer water vortex. The particular vane design will be detailed further below. The shapes of hub 82 and vanes 80 are selected in relation to the surrounding structure to provide therebetween an annular opening whose area decreases with distance from entrance 78. In this region therefore the velocity of the entering mixture is substantially increased. In the practice of this invention it is preferable to effect a velocity increase to about 100 feet per second. Simultaneously the accelerated steam-water mixture is given a rotary motion by means of vanes 80. The approximate boundary between these vortices is indicated by broken line 84. A first annular water removal means comprises inner tube 86 which is spaced apart from and extends concentrically a short distance into the outlet end of vortex tube 74 and forms water vortex outlet 88, a first annular top plate 90 whose inner edge is secured to the upper edge of inner tube 86 and which plate is disposed transverse to the longitudinal axis of the apparatus, and a cylindrical skirt 92 spaced concentrically apart from the outer surface of the vortex tube 74, the skirt being secured at its upper edge to the outer edge of first top plate 90 to provide therebetween water vortex outlet passage 94 having an annular outlet opening 96. Straightening vanes 95 discussed further below are provided in passage 94 to arrest the rotary motion of the water vortex.

A second annular or boundary layer water removal means is provided which is coaxial with and which partially surrounds the first such annular means. The second annular means includes a steam vortex outlet tube 98 which extends coaxially through inner tube 86 and forms therebetween boundary layer outlet 100, a second annular top plate 102 whose inner edge is secured to the upper edge of the steam vortex outlet tube 98 and which is parallel to the first top plate 90, and an outer tube 104 secured to the outer edge of second top plate 102 in a position coaxially surrounding skirt 92 and forming therebetween boundary layer discharge passage 106 having annular outlet opening 108. As shown in FIGURE 1 vortex outlet tube 98 extends through and beyond the inlet edge of inner tube 86, thus placing the inlet opening of tube 98 in steam-receiving relation with vortex tube 74 in a region upstream from the inlet opening of the first annular water removal means. A mass of fluid permeable contact material 110 is positioned at the annular outlet opening 108 to diffuse the stream of discharge liquid and prevent its disturbance of the surrounding liquid level 112.

In operation, the steam vortex flows through inner tube 98 into the preliminary dryer 72 hereafter detailed. The water vortex passes through annular outlet opening 88, its axial flow direction is reversed 180° as it flows beneath first top plate 90 and back through water outlet passage 94 toward annular outlet opening 96 in the direction indicated by the arrows. In outlet passage 94 straightening vanes 95 are provided and by means of which the helical motion of the water removed from the water vortex is arrested.

In high capacity testing of the prior art devices, it was found that they were subject to excessively high liquid carryover in the vapor effluent when operation at very high rates was attempted. It was believed that this flow peculiarity was due to the frictional drag forces exerted by the lower surface of the top plate acting on the rotating vortex liquid as it passes beneath the top plate over the upper edge of the vortex tube. The drag was believed to induce local eddy currents in this region of liquid flow reversal whereby a portion of this liquid was induced to flow inwardly across the lower surface of the top plate and downwardly along the outer surface of the steam outlet pipe as a boundary layer flow. Some of this boundary layer flow appeared to flow or spill around the lower edge of the outlet pipe and contaminate the steam effluent. Excessively high carryover of moisture result.

In the separator of the present invention, the second annular water removal means described above and shown in FIGURES 1 and 2 was provided to collect and remove this boundary layer spillage and prevent steam effluent contamination even at every high flow rates. This second annular boundary layer water removal means includes steam vortex outlet tube 98 which extends to a point upstream from the inlet edge of inner tube 86 of the first water removal means, second top plate 102, and outer tube 104. The boundary layer flow thus enters annular boundary outlet 100 at a point downstream from the entrance to vortex outlet tube 98 and is thereby prevented from entering the effluent steam flowing therethrough. The boundary layer water thus collected is passed 180° around the first removal means and discharges downwardly on the outside of skirt 92 through boundary outlet opening 108 and diffuser screen 110 in which the kinetic energy of the boundary layer flow is substantially dissipated. This screen prevents the disturbance of the liquid surface 112 of the body 114 of liquid surrounding the separator. In this way the moisture contamination of the steam phase located above the liquid level 112 and steam contamination of the liquid phase 114 are simultaneously minimized.

Through the functioning of the first annular (vortex) liquid removal means and the second (boundary layer) liquid removal means in the separator of this invention, the steam vortex discharged through steam outlet tube 98 into preliminary dryer 74, even at high flow rates, has a substantially lower moisture content that that of separators of the prior art operating at equal input rates, and a substantially higher permissible input rate or capacity for a given maximum allowable steam effluent moisture contamination as illustrated in the examples given below.

The vortex forming nozzles and vanes used in the separator of this invention are designed according to the procedures well known in this art and which are fully defined in the literature such as "Centrifugal and Axial Flow Pumps" by A. J. Stepanoff, John Wiley and Son, 1948, pages 16 and 144–154; Report No. 1602 of Oak Ridge National Laboratory by J. A. Hafford describing development of Pipeline Gas Separator (undated), and others. The nozzles preferred in this invention are those producing free vortex flow in the vortex tube at the maximum expected volumetric input to the separator. The separator with such nozzles has been found to operate exceedingly well as any flow rate below this maximum.

The preliminary centrifugal dryer 72 of this invention comprises dryer housing 120, which if desired may be a continuation of outer tube 104, an annular dryer top plate 122, a perforated inner cone 124 provided with openings 126 and an imperforate bottom 128 of truncated conical shape having a central outlet opening 130. The lower edge of dryer housing 120 is provided with a plurality of openings 132 at points just above second top plate 102. A ring 136 of triangular cross section is disposed centrally around the outlet end of steam vortex outlet pipe 98 within the preliminary dryer 72. This ring on its inner surface 138 forms one side of an annular entrance to dryer 72 for the steam vortex, the other side of the entrance being the lower surface of lower cone 128. These surfaces are essentially parallel forming a passage whose minimum cross sectional area A1 open to flow is at least equal to the cross sectional area A2 of steam vortex outlet tube 98 and whose cross sectional area increases with distance through the annular passage. The outer or peripheral surface 140 of ring 136 acts as a dam which prevents the liquid 142 collected from the outer or first drying mesh 144 from re-entering the steam entering the dryer. This mesh is a cylindrical form arranged on the inner surface of dryer housing 120. A second or inner drying mesh 146 of truncated conical shape (apex downward) is disposed on the inner surface of perforated inner cone 124.

The steam vortex entering the dryer 72 from separator 70 through steam vortex outlet 98 flows between lower cone 128 and ring 136 into the region between perforated cone 124 and drying mesh 144. Centrifugal forces generated in the vortex cause the entrained liquid droplets to be carried into the drying mesh. The extensive surface area of this mesh provides high frictional drag forces to the outer regions of the steam vortex. The mesh absorbs some of the kinetic energy of the steam vortex reducing its rotary velocity and causing a substantial portion of the entrained liquid droplets to precipitate. The precipitated liquid droplets are accumulated on the mesh surfaces where the absence of the high steam vortex velocity and the presence of gravitational forces permit the precipitated moisture to drain downwardly forming liquid body 142. The liquid overflows through openings 132 provided at the lower edge of dryer housing 120 and into the liquid body 114.

The steam vortex, now at a reduced rotary velocity and containing a decreased moisture content, flows upwardly and inwardly through openings 126 in inner cone 124 and through inner drying mesh 146. Because the steam vortex is forced to flow completely through the mesh, its rotary velocity is virtually destroyed, and a further reduction of the entrained moisture content is effected by the same mechanism as in outer mesh 144. The total area A3 of openings 126 in inner cone 124 is at least equal to and preferably greater than the minimum area A1 open to flow in the diverging annular passage between ring 136 and lower cone 128. The moisture accumulating in inner mesh 146 drains by gravitational forces and accumulates within lower cone 128 from which it drains through central opening 130 passing into the lower pressure core along the axis of the steam vortex in vortex tube 74. Here it acquires a rotary velocity if it is diverted from the longitudinal axis of the device and is centrifugally re-separated from the steam and is returned to the water vortex. The effluent vapor from preliminary dryer 72 is discharged through outlet opening 148, whose area A4 is at least equal to the total area A3 of openings 126 in upper cone 124. The moisture content is about 6% by weight or less at the maximum flow rate.

In FIGURE 2 appears a transverse cross section view of the separator according to this invention taken at the elevation indicated in FIGURE 1 and which shows the coaxial relationship of the various elements described above. At progressively increasing radii are shown steam vortex outlet tube 98, boundary layer outlet opening 100, inner tube 86, water vortex outlet opening 88, vortex tube 74, water outlet passage 94, skirt 92, boundary layer discharge passage 102, and outer tube 104. Within water outlet passage 94 are positioned 12 straightening vanes 95 spaced 30° apart in this instance.

In FIGURE 3 is an oblique view in partial cross section of the vortex tube 74 showing inlet vanes 80, hub 82, and the straightening vanes 95 of a slight modification of the separator of FIGURE 1. The modification lies in the elimination of the entrance tube 76, the extension of vortex tube 74 to the inlet opening, and the positioning of the vortex forming vanes 80 and hub 82 in the lower portion of the vortex tube. Vortex tube 74 is provided at its upper end on its outer surface with a plurality of straightening vanes 95 curved at their upper ends to coincide with the helical angle of flow of the water vortex discharge over the upper edge of vortex tube 74. This angle usually lies between about 5° and about 15° with respect to the horizontal as measured at the blade root. The lower or discharge ends of these vanes are formed to discharge the flow in a direction parallel to the separator longitudinal axis.

The lower portion of vortex tube 74 is cut away to show at its inlet end the vortex forming vanes 80 by means of which the liquid and vapor vortices are created. These inlet vanes are curved with their lower or inlet ends parallel to the flow direction of the inlet mixture and their upper or outlet ends are curved to direct the flow through the nozzle spaces between the vanes into a helical course to generate the vortices. Root angles of from 30° to 40° with respect to the horizontal are appropriate.

The following examples illustrate the construction and performance of the separator-dryer device of the present invention.

EXAMPLE I

A steam separator embodying the principles of the present invention has the approximate dimensions shown in Table I following:

*Table I.—Improved separator of this invention*

| Item— | Dimension |
|---|---|
| Vortex tube 74: | |
| Diameter _____inches__ | 8.50 |
| Length _____do____ | 24.0 |
| Steam outlet tube 98: | |
| Diameter _____do____ | 5.375 |
| Length _____do____ | 3 |
| Second top plate 102: | |
| Outside diameter _____do____ | 13.50 |
| Outer tube 104: | |
| Length _____do____ | 25.5 |
| Inner tube 86: | |
| Diameter _____do____ | 6.625 |
| Length _____do____ | 1.5 |
| First top plate 90: | |
| Outside diameter _____do____ | 12 |
| Skirt 92: | |
| Length _____do____ | 25 |
| Inlet vanes 80: | |
| Type | Free vortex |
| Number | 8 |
| Angles*: | |
| Inlet end | 90° |
| Outlet end | 27° |
| Straightening vanes: | |
| Type | Free vortex |
| Number | 12 |
| Angular spacing | 30° |
| Inlet angle* | 15° |
| Outlet angle | 90° |
| Preliminary dryer 72: | |
| Type | Centrifugal |
| Outer mesh 144: | |
| Inside diameter | 11.25 |
| Height _____inches____ | 7.0 |
| Thickness _____do____ | 1.0 |
| Inner mesh 146: | |
| Top _____do____ | 11.5 |
| Bottom _____do____ | 5.6 |
| Thickness _____do____ | 1.0 |

*Relative to horizontal.

EXAMPLE II

This steam separator dryer was tested at 1000 p.s.i.g. and 546° F. with the 9.66% quality steam-water mixture. It was determined that the maximum capacity taken at 6% moisture entrainment of effluent steam, was about 35,000 cubic feet of steam-water mixture per hour. This corresponds to a steam rate of 53,400 pounds per hour at the inlet quality specified. This is an 80% increase over the capacity of the prior art separator. It was also found that the axial distance or gap between the outlet end of vortex tube 74 and the lower surface of first top plate 90 had a critical effect upon the performance of this separator-preliminary dryer device. The device was constructed to permit a variation of this axial gap to study its effect. The results of this study and the variation in the capacity performance of the separator of this invention are graphically illustrated in FIGURE 4.

In FIGURE 4, the weight percent entrained moisture in the effluent steam from the Example I steam separator-preliminary dryer of this invention is shown plotted against the axial gap at the end of the vortex tube and against the distance which inner tube 86 extends past the outlet end of the vortex tube or "overlaps" expressed as percent of this axial gap, taken at parameters of various inlet flow rates in pounds per hour. For axial gap values rising from about 0.65 to about 1.25 inches and as the overlap was decreased from 150% to 25% of the gap, a critical effect upon the moisture content of the effluent steam was found. At each inlet flow rate, the effluent moisture decreased through a minimum value and then rose again as the axial gap and overlap values were varied through the ranges given. The effluent steam moisture contents for various feed rates and with an axial gap of 1.0 inch, an overlap of about 50%, are shown in the following table.

*Table II*

| Flow rate, cubic ft./hr. | Effluent moisture, weight percent | Head loss, feet of mixture |
|---|---|---|
| 35,000 | 6.0 | 130 |
| 32,000 | 3.5 | 110 |
| 28,000 | 2.2 | 87 |
| 24,000 | 1.3 | 65 |
| 20,000 | 1.0 | 45 |

Taking the same carryover of 6% moisture in the effluent steam as a limit, it is apparent that the Example I separator-dryer of this invention has a maximum capacity of approximately 35,000 cubic feet per hour at an axial end gap of about 1.0 inch. The separated water under these conditions contained about 0.2% by weight of steam as "carryunder." This capacity is 180% of that of the prior art separator.

The following examples illustrate the variation in maximum permissible power output rating (as limited by steam separation capacity) of a boiling water reactor operated at 1000 p.s.i. and 546° F. and having the largest core which can be placed in a pressure vessel 160 inches inside diameter.

EXAMPLE III

A boiling water reactor having a core rated at a maximum of 1100 mwt. (megawatts thermal) consists of 276 fuel assemblies approximately 10 feet long, approximately 7 by 7 inches in cross section, and containing an assembly of Zircaloy clad $UO^2$ fuel elements of about 2.1 percent $U^{235}$ content, the elements being arranged on a square pitch spaced approximately 0.642 inch center-to-center in a 10 by 10 array. The circumscribed diameter of this core is about 135 inches. The average heat transfer rate from these fuel rods to the boiling coolant is 128,000 B.t.u./hr. ft.$^2$ with peak values at 474,000 B.t.u./hr. ft.$^2$ at maximum rating. When this reactor is operated without special steam separating devices of any kind within the reactor vessel and utilizing the free separation of steam at the upper surface of the body of boiling liquid present in the vessel to produce steam with no more than 6% entrained moisture, the steam separation capacity limits the maximum thermal rating at which the core can be operated to 270 mwt. This is sufficient to drive a turbine-generator to produce electrical energy at a rate of approximately 87 mwe. (megawatts electrical).

EXAMPLE IV

When the boiling water reactor plant of Example III is provided with 85 prior art steam separators, and this is the maximum number having correspondingly sized vortex tubes which can be positioned in the 160-inch diameter vessel referred to above, the steam separation capacity limits the maximum core thermal rating to 610 mwt. The corresponding electrical output is 197 mwe., an increase of about 126% over the Example III output.

EXAMPLE V

When the boiling water reactor power plant of Example III is provided with 85 improved steam separator-preliminary dryer devices according to this invention and as described in FIGURES 1–3 and Examples I and II, the steam separation capacity permits the maximum core thermal rating to be increased to the full 1100 mwt. The permissible electrical output is 356 mwe. This is an increase of 310% over the Example III value, and 80% over the Example IV value using prior art separators.

It is thus apparent from the preceding description and illustration that the steam separator preliminary dryer of the present invention provides a substantial improvement over prior art devices, and further permits a very large increase in the maximum power output of compact steam sources such as a boiling water nuclear reactor.

Vapor-liquid separators embodying the principles of the present invention may be designed to separate other vapor-liquid mixtures, or designed in different sizes, capacities, or both through the use of the following equation which relates vortex tube length and diameter to fluid physical properties.

$$L = \frac{4V_y}{9A_1C^{0.82}}\left[R^{2.25} - \left(\frac{C^2(R')^2}{C^2 - 2g_cL(R')^2}\right)^{1.11}\right]$$
$$+ \frac{g_c^2R^4}{4C^2} - \frac{g_c^2}{4_c^2}\left[\frac{C^2(R')^2}{C^2 - 2g_cL(R')^2}\right]^2$$

where:

$$R < C^{0.67}$$

$$\frac{0.0084(kg_c\sigma)^{1.3}}{V_L^{1.74}}\left[\frac{\rho L^2}{\rho L - \rho g}\right]\left[\frac{g_c}{\rho L}\right]^{0.57}$$
$$\leq \frac{Z^3}{Z^2 + g_c^2} \leq 0.136\left[\frac{g_c}{\rho L}\right]\left[\frac{\rho L^2}{\rho L - \rho g}\right]$$

and

L—Length of vortex
Z—$V_t^2/r$
$V_t$—tangential fluid velocity
r—radius of elemental volume
$V_y$—axial velocity component
R'—inlet nozzle root radius
R—vortex tube radius
$\sigma$—surface tension of liquid
$V_L$—viscosity of liquid
$g_c$—gravitational constant
$\rho L$—density of liquid
$\rho g$—density of gas
k—constant, range 1 to 3
C—$V_tr$, constant in free vortex equation $$A_1 = 1.35(kg_c\sigma)^{0.25}\left(\frac{\rho L}{g_c}\right)^{0.167}\left[\frac{\rho L - \rho g}{\rho L^2}\right]^{0.42}$$

This relationship between fluid velocity and the diamter and length of the vortex tube is dependent upon physical properties of the fluid involved. Separators of this type can be scaled in size by means of a modified Froude number resulting in the relationship $$\frac{Q_m}{Q_p} = (\text{scale factor})^{2.5}$$

where Q is the volume flow rate, subscript $p$ refers to the prototype, and subscript $m$ refers to the model.

In the separator of the present invention, the use of the centrifugal preliminary dryer, two annular liquid removal means, and the observation of critical dimensional considerations with respect to the axial gap between the top plate of the first annular liquid removal means and the outlet edge of the vortex tube and with respect to the degree of projection of the inner tube into the vortex tube, each contribute to the enhanced performance. The length of the inner tube of the first annular liquid removal means is between about 2% and about 20% of the vortex tube length, and preferably between about 5% and about 10% of this length. It is also between about 20% and about 50% of the vortex tube radius. The extent to which the inner tube extends into or "overlaps" the edge of the vortex tube, and the size of axial gap referred to above have been found to have a critical effect upon the separation efficiency, particularly at maximum flow rates. These dimensions are subject to substantial latitude at less than maximum capacity, i.e., at below the acceptable effluent entrained liquid content. For example, at about 80% of maximum capacity, entrained moisture can be kept below about 6% in steam service at 1000 p.s.i. with axial gap variations of from about 20% below to about 35% above the gap giving minimum carryover. At lower rates the variation is greater. However, the maximum capacity the permissible variation is about plus or minus 10% of the axial gap giving minimum carryover. The inner tube "overlap" expressed as a percentage of the axial gap also is less critical at lower than maximum capacity. This percentage ranges from about 15% to about 90% at 80% of maximum capacity, but it reduces to between about 35% and 65% at maximum capacity.

A particular embodiment of the present invention has been herein above described in considerable detail by way of example. It should be understood that various modifications and adaptations may be made by those skilled in this particular art without departing from the spirit and scope of this invention as set forth in the appended claims.

We claim:

1. A vapor-liquid separator and preliminary dryer which comprises an elongated vortex tube having a vapor-liquid mixture inlet opening axially at one end and an outlet opening axially at the other end, means adjacent said inlet opening for imparting to a vapor-liquid mixture a rotary motion sufficient to establish within said vortex tube a vapor vortex surrounded by a liquid vortex, a first annular liquid removal means surrounding and spaced apart from the outlet edge of said vortex tube and forming therebetween a first annular liquid flow reversing outlet passage to receive said vortex and conduct it 180° axially around said outlet edge, a second annular liquid removal means surrounding and spaced apart from said first annular means and forming therebetween a second annular liquid flow reversing outlet passage to receive boundarry layer liquid spillage from the entrance to said first annular means and to conduct said spillage 180° axially around said first annular means, said second annular means having a central vapor vortex outlet opening communicating in vapor receiving relation with said vortex tube upstream from the inlet opening of said first annular liquid removal means, a dryer housing having an upper dried vapor outlet opening and connected in vapor vortex receiving relation to said vapor vortex outlet opening, a cylindrical layer of fluid permeable contact material disposed on the inner wall of said housing, a conical layer of fluid permeable contact material disposed apex downward within and spaced apart from said cylindrical layer and registering at its upper edge with said vapor outlet opening of said housing, and means for accumulating and conducting away from each of said fluid permeable layers liquid separated thereby from said vapor.

2. A vapor-liquid separator and preliminary dryer according to claim 1 wherein said means adjacent the vortex tube inlet opening for imparting rotary motion comprise free vortex vanes.

3. A vapor-liquid separator and preliminary dryer according to claim 1 wherein said first annular liquid removal means surrounding and spaced apart from the outlet edge of said vortex tube comprises an inner tube extending concentrically a short distance into the outlet opening of said vortex tube, a first annular top plate spaced transversely apart from the outlet edge of said vortex tube with its inner edge secured to the upper edge of said inner tube, and a cylindrical skirt spaced concentrically apart from the outer surface of said vortex tube, said skirt being secured at its upper edge to the outer edge of said first annular top plate.

4. A vapor-liquid separator and preliminary dryer according to claim 3 in combination with a plurality of flow straightening vanes disposed in the annular outlet passage between said skirt and said vortex tube to arrest the rotary motion of the water vortex in said annular outlet passage.

5. A vapor-liquid separator and dryer according to claim 3 wherein said second annular liquid removal means surrounding and spaced apart from said first annular means comprises a vapor vortex outlet tube disposed coaxially within and extending through said inner tube, said vapor vortex outlet tube having an inlet opening disposed upstream from the inlet opening of said inner tube, a second annular top plate spaced transversely apart from said first top plate and secured at its inner edge to the upper edge of said vapor vortex outlet tube, and an outer tube coaxially surrounding said skirt and secured at its upper edge to the outer edge of said second top plate.

6. A vapor-liquid separator and dryer according to claim 5 in combination with a mass of fluid permeable contact material disposed at the annular outlet opening of the annular passage between said outer tube and said skirt.

7. A vapor-liquid separator and preliminary dryer which comprises an elongated vortex tube having a vapor-liquid mixture inlet opening axially at one end and an outlet opening axially at the other end, means adjacent said inlet opening for imparting to a vapor-liquid mixture a rotary motion sufficient to establish within said vortex tube a vapor vortex surrounded by a liquid vortex, a first annular liquid removal means surrounding and spaced apart from the outlet edge of said vortex tube and forming therebetween a first annular liquid flow reversing outlet passage to receive said vortex and conduct it 180° axially around said outlet edge, a second annular liquid removal means surrounding and spaced apart from said first annular means and forming therebetween a second annular liquid flow reversing outlet passage to receive boundary layer liquid spillage from the entrance to said first annular means and to conduct said spillage 180° axially around said first annular means, said second annular means having a central vapor vortex outlet opening communicating in vapor receiving relation with said vortex tube upstream from the inlet opening of said first annular liquid removal means, a dryer housing having an upper dried vapor outlet opening, said housing being connected in vapor vortex receiving relation to said vapor vortex outlet opening, a cylindrical layer of fluid permeable contact material disposed on the inner wall of said housing so as to preclude radial flow through said layer a conical layer of fluid permeable contact material disposed apex downward within and spaced apart from said cylindrical layer and registering at its upper edge with the upper dried vapor outlet opening of said housing, an imperforate bottom having a central outlet opening on the longitudinal axis of said separator and secured to the lower base of said conical layer of fluid permeable contact material, and a means within said dryer housing forming a dam around the vapor vortex outlet of said second annular liquid flow removal means, said dryer housing being provided with at least one opening adjacent its lower edge.

8. A vapor-liquid separator which comprises an elongated hollow vortex tube having a vapor-liquid mixture inlet opening axially at one end and an outlet opening axially at the other end, said outlet opening having an outlet edge, means adjacent said inlet opening for imparting to a vapor-liquid mixture a rotary motion sufficient to establish within said vortex tube a vapor vortex surrounded by a liquid vortex, a first annular liquid removal means surrounding and spaced apart from the outlet edge of said vortex tube and forming therebetween a first annular liquid flow reversing outlet passage to receive said liquid vortex and conduct it 180° around said outlet edge, said first annular liquid removal means having an annular entrance opening disposed upstream from the outlet edge of said vortex tube, and a second annular liquid removal means surrounding and spaced apart from said first annular means and forming therebetween a second annular liquid flow reversing outlet passage having an inlet to receive boundary layer liquid spillage from said annular entrance opening of said first annular means and to conduct said spillage 180° axially around said first annular means, said second annular means having a central vapor vortex outlet opening communicating in vapor-receiving relation with said vortex tube in a region upstream from said annular entrance opening of said first annular liquid removal means.

9. A vapor-liquid separator according to claim 8 wherein said means adjacent the vortex tube inlet opening for imparting rotary motion comprise vortex inducing vane means for imparting rotary motion to said vapor-liquid mixture.

10. A vapor-liquid separator according to claim 8 wherein said first annular liquid removal means surrounding and spaced apart from the outlet edge of said vortex tube comprises an inner tube extending concentrically a short distance into the outlet opening of said vortex tube, a first annular top plate having an inner edge and an outer edge, said first top plate secured transversely apart from the outlet edge of said vortex tube with its inner edge secured to the upper edge of said inner tube, and a cylindrical skirt spaced concentrically apart from the outer surface of said vortex tube, said skirt being secured at its upper edge to the outer edge of said first annular top plate.

11. A vapor-liquid separator according to claim 10 wherein said second annular liquid removal means surrounding and spaced apart from said first annular means comprises a vapor vortex outlet tube disposed coaxially within and extending in through said inner tube, said vapor vortex outlet tube having an inlet opening disposed upstream from said annular entrance opening of said first annular liquid removal means, a second annular top plate having an inner edge and an outer edge, said second top plate spaced transversely apart from said first top plate and secured at its inner edge to the upper edge of said vapor vortex outlet tube, and an outer tube coaxially surrounding and spaced apart from said skirt and secured at its upper edge to the outer edge of said second top plate.

12. A vapor-liquid separator according to claim 10 wherein said first annular liquid removal means is provided with an inner tube having a length between about 2% and about 20% of the length of said vortex tube, and said removal means is positioned with respect to the outlet edge of said vortex tube so that the extent to which said inner tube overlaps said edge, expressed as a percentage of the axial gap between said outlet edge of said vortex tube and said first top plate of said removal means, is between about 15% and 90%.

13. A vapor-liquid separator according to claim 10 wherein said first annular liquid removal means is provided with an inner tube having a length between about 5% and about 10% of the length of said vortex tube, and said removal means is positioned with respect to the outlet edge of said vortex tube so that the extent to which said inner tube overlaps said outlet edge of said vortex tube, expressed as a percentage of the axial gap between said outlet edge of said vortex tube and said first top plate of said removal means, is between about 35% and 65%.

14. A vapor-liquid separator which comprises an elongated vortex tube having a vapor-liquid mixture inlet opening axially at one end and an outlet opening axially at the other end; means adjacent said inlet opening for imparting to a vapor-liquid mixture a rotary motion sufficient to establish within said vortex tube a vapor vortex surrounded by a liquid vortex; a first annular liquid removal means surrounding and spaced apart from the outlet edge of said vortex tube and forming therebetween a first annular liquid flow reversing outlet passage to receive said liquid vortex and conduct it 180° around said outlet edge; said first annular liquid removal means including an inner tube extending concentrically a short distance into the outlet opening of said vortex tube, a first annular top plate secured transversely apart from the outlet edge of said vortex tube with its inner edge secured to the upper edge of said inner tube, and a cylindrical skirt spaced concentrically apart from the outer surface of said vortex tube, said skirt being secured at its upper edge to the outer edge of said first annular top plate; a second annular liquid removal means surrounding and spaced apart from said first annular means and forming therebetween a second annular liquid flow reversing outlet passage to receive boundary layer liquid spillage from the entrance to said first annular means and to conduct said spillage 180° axially around said first annular means; said second annular liquid removal means including a central vapor vortex outlet tube disposed coaxially within and spaced apart from and communicating in vapor-receiving relation with said vortex tube in a region upstream from the inlet opening of said first annular liquid removal means, said second annular liquid removal means including a vapor vortex outlet tube disposed coaxially within and extending in through and spaced apart from said inner tube, a second annular top plate spaced transversely apart from said first top plate and secured at its inner edge to the upper edge of said vapor vortex outlet tube, and an outer tube coaxially surrounding and spaced apart from said skirt and secured at its upper edge to the outer edge of said second top plate; and a mass of fluid-permeable contact material disposed at the annular outlet opening of the annular passage between said outer tube and said skirt.

15. A dryer for removing residual quantities of entrained liquid from a vapor phase vortex which comprises a cylindrical dryer housing having a moist vapor inlet opening axially located at one end and a dried vapor outlet axially located at the other end, an annular layer of fluid-permeable contact material disposed with its entire outer cylindrical surface in contact with the inner cylindrical surface of said housing, means for accumulating and conducting away from said annular layer of fluid-permeable material liquid separated thereby, a perforated truncated conical support member coaxially disposed apex downward within said housing and spaced apart from said annular layer and sealed at its upper edge to said vapor outlet, a truncated conical layer of fluid-permeable contact material disposed apex downward in contact with and supported by said perforated conical member, and a conical bottom for said perforated conical support member and coaxially disposed apex downward and sealed at its upper edge to the lower edge of said perforated conical member and having an opening at its apex for separated liquid.

16. A dryer for removing residual quantities of entrained liquid in a vapor phase which comprises a dryer housing having an inlet opening centrally located at one end and a dried vapor outlet centrally located at the other end, a cylindrical layer of fluid permeable contact material disposed adjacent the inner wall of said housing, a truncated conical layer of fluid permeable contact material disposed apex downward within and spaced apart from said cylindrical layer and registering at its upper edge with said vapor outlet, an imperforate bottom having a central outlet opening on the longitudinal axis of said dryer and secured to the lower base of said conical layer of fluid permeable contact material, and means within said dryer housing forming a dam around said inlet opening, said dryer housing being provided with at least one opening adjacent its lower edge.

17. A dryer according to claim 16 wherein the minimum cross sectional area $A_1$ open to flow between said dam forming means and said imperforate bottom is at least equal to the area $A_2$ of the vapor inlet opening to said housing, wherein said truncated conical layer of contact material is supported by means of a truncated and perforated inner cone, the total perforated area $A_3$ of which is at least equal to area $A_1$, and the area $A_4$ open to flow at the dried vapor outlet opening of said housing is at least equal to area $A_3$.

References Cited by the Examiner

UNITED STATES PATENTS

| 1,329,138 | 1/20 | Olleo | 55—484 X |
| 2,106,589 | 1/38 | Bigger et al. | 55—399 X |
| 2,506,298 | 5/50 | Griffen | 55—416 |
| 2,594,490 | 4/52 | Patterson | 55—457 X |
| 2,648,397 | 8/53 | Ravese et al. | 55—457 X |
| 2,891,632 | 6/59 | Coulter | 55—440 X |
| 2,936,043 | 5/60 | Armstrong et al. | 55—457 X |
| 2,970,671 | 2/61 | Warner | 55—327 |

FOREIGN PATENTS

| 496,843 | 10/53 | Canada. |
| 823,960 | 10/37 | France. |

HARRY B. THORNTON, *Primary Examiner.*